April 17, 1956 R. O. SHIRLEY 2,741,866
ANIMAL TRAP
Filed Nov. 7, 1952 2 Sheets-Sheet 1
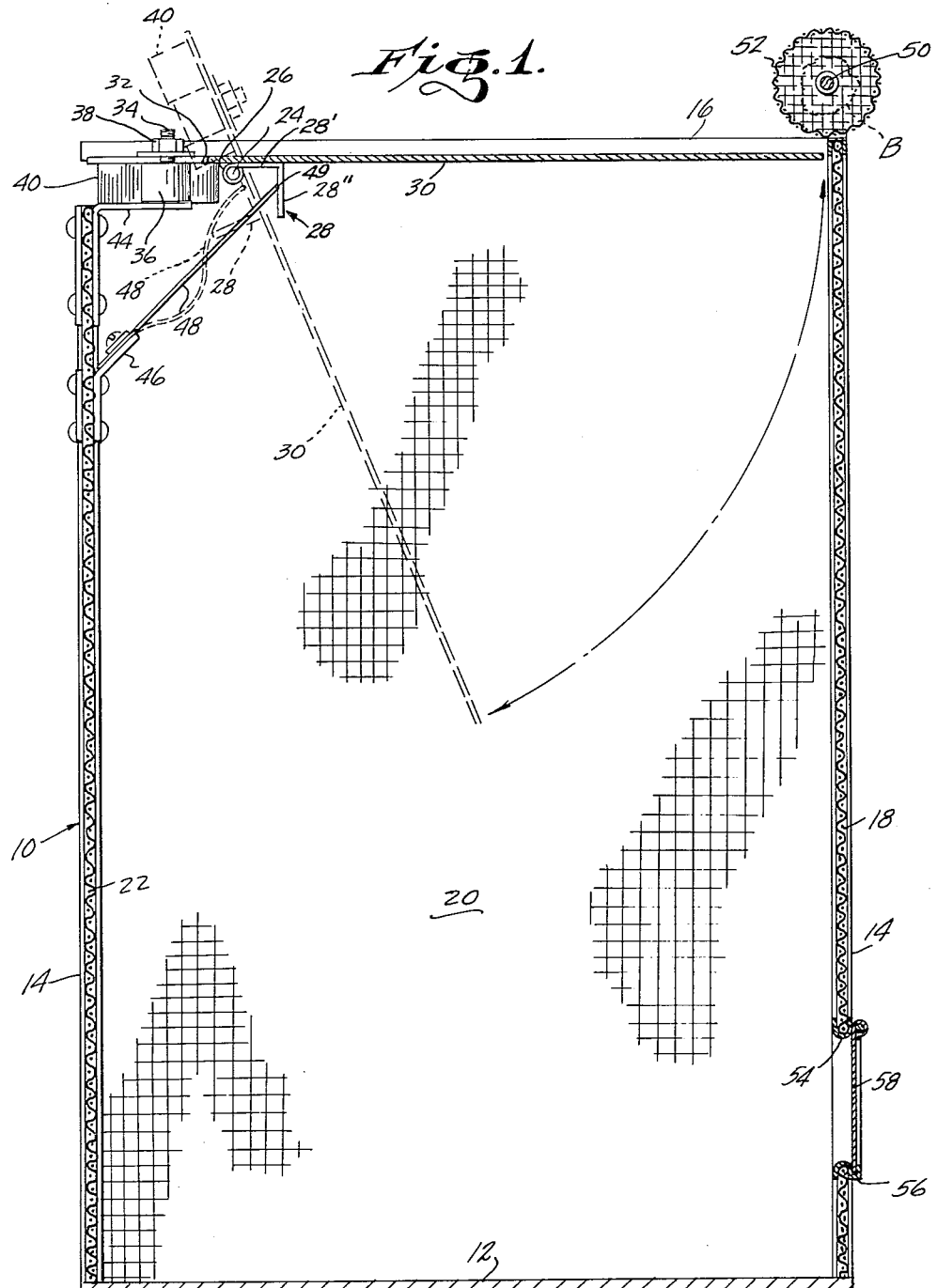
INVENTOR.
Robert O. Shirley,
BY
McMorrow, Berman & Davidson
ATTORNEYS.

April 17, 1956 R. O. SHIRLEY 2,741,866
ANIMAL TRAP
Filed Nov. 7, 1952 2 Sheets-Sheet 2
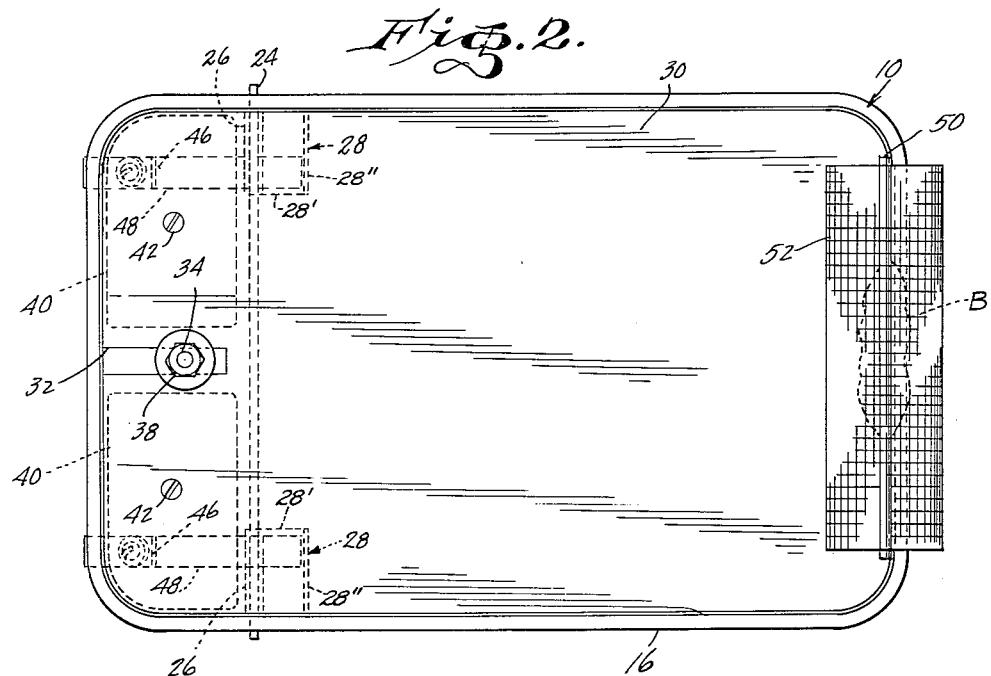
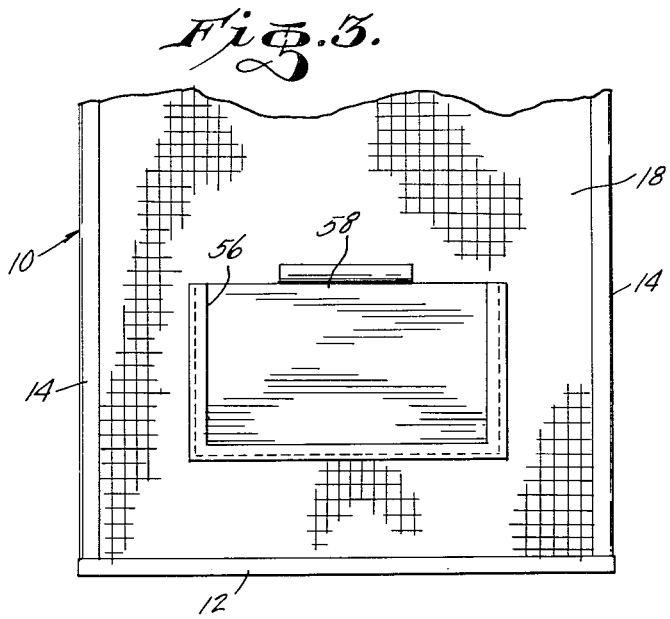
INVENTOR.
Robert O. Shirley,
BY
McMorrow, Berman & Davidson
ATTORNEYS

United States Patent Office 2,741,866
Patented Apr. 17, 1956

2,741,866

ANIMAL TRAP

Robert O. Shirley, Memphis, Tenn.

Application November 7, 1952, Serial No. 319,253

2 Claims. (Cl. 43—69)

This invention relates to animal traps, and more particularly, has reference to an animal trap of the type including a normally closed trap door that opens under the weight of an animal.

It is one important object of the present invention to provide an animal trap that will be so designed as to cause the trap door to remain normally closed until the animal is supported entirely upon the door, after which the trap door shifts under the weight of the animal to an open position, thus to drop the animal into a suitable receptacle.

Another object is to provide an animal trap of the character described in which the trap door is returned, by a trigger-like, split-second action, to a normally closed position, the means embodied in the invention for returning the trap door to a normally closed position including a cooperating assembly of counter weights, a magnet, and return spring.

Another object of importance is to provide a trap of the type stated which will be so designed as to be capable of manufacture at a relatively low cost, considering the benefits to be obtained from the use thereof.

Still another object is to provide a trap of the type stated which will be sure in operation, and which will, additionally, be so designed as to permit the animal to be removed safely.

Other objects will appear from the following description, the claims appended thereto, and from the annexed drawings, in which like reference characters designate like parts throughout the several views, and wherein:

Figure 1 is a vertical sectional view through a trap formed in accordance with the present invention, the full lines indicating the closed position of the trap door and the dotted lines indicating the open position of said trap door;

Figure 2 is a top plan view of the trap with the door in the closed position; and Figure 3 is a front elevational view of the trap, the upper portion of the trap being broken away.

Referring to the drawings in detail, the reference numeral 10 has been applied generally to a container, which is adapted to receive the animal after the animal is dropped through the trap door. The container 10 can be formed from any of various materials, and can be of any desired cross sectional configuration. In one commercial embodiment of the invention, the container 10 can have the shape illustrated in the drawings, said container having a rectangular, flat bottom plate 12 formed of wood, sheet metal, or the like.

Fixedly secured to the several corners of the bottom plate 12 are vertically disposed corner posts 14, the posts 14 being fixedly connected at their upper ends to a horizontally disposed top rim 16 of channeled cross sectional shape. The top rim 16 and posts 14 define a framework, supporting a screen mesh front wall 18, mesh side walls 20, and a screen mesh back wall 22.

Thus, a box-like container of vented design, formed open at its upper end, is provided.

Extending transversely of the container 10, at the upper end thereof, is a hinge pin 24, said hinge pin being connected at its opposite ends to the opposite sides of the rim 16. The hinge pin 24 is disposed adjacent the back wall 22 of the container, and circumposed about the opposite end portions of said hinge pin are hinge sleeves 26, integrally formed on angle brackets 28 of inverted L-shape. Each bracket 28, as shown in Figure 1, has a horizontal leg 28' integrally connected to the associated hinge sleeve 26, said horizontal leg merging into a vertical, depending leg 28".

A trap door has been designated by the reference numeral 30, and when in its closed position, shown in full lines in Figure 1, substantially closes the upper end of the container 10. The trap door 30 can be formed of a suitable piece of sheet metal material formed to a rectangular outer configuration, said trap door being fixedly connected to the respective angle brackets 28, thereby to pivotally mount the trap door upon the container for swinging movement between the full and dotted line positions shown in Figure 1.

Formed in one end of the trap door is a slot 32, said slot extending longitudinally and centrally of the trap door (see Figure 2), and terminating barely short of the hinge pin 24. The slot 32 is adapted to receive an upstanding bolt 34 rigidly secured at its lower end to a brass shielded magnet 36, the magnet 36 being of the permanent type, and depending from the underside of the trap door 30.

The arrangement illustrated is one that permits the magnet to be adjusted toward and away from the pivot axis of the trap door, the purpose of this arrangement being to adjust the device in a manner that will cause the magnet to exert its magnetic influence at a selected time during the swinging movement of the trap door from its open to its closed position.

To fixedly connect the magnet to the trap door in selected positions of adjustment of the magnet, a nut 38 is employed, said nut being threadedly engaged with the bolt 34 and bearing against a washer that bridges the slot 32.

At opposite sides of the magnet, I provide counterweights 40, said counter-weights being secured dependingly from the trap door 30 by screws 42, which screws extend through suitable apertures formed in the trap door.

A supporting bracket 44 (see Figure 1) is of inverted L shape, and is fixedly connected to the back wall 22 of the container 10. The supporting bracket 44 has a horizontally extended leg adapted to underlie the magnet 36, the magnet 36 contacting the horizontal leg of bracket 44 in the closed position of the trap door 30.

The bracket 44 is formed of a substance adapted to be attracted magnetically, and as a result, when the trap door is swinging from the dotted line to the full line position shown in Figure 1, the trap door will eventually move to a location at which the magnetic influence of the magnet will be exerted upon the bracket 44, thus to cause the trap door to be, in effect, snapped to its fully closed position.

Disposed below the bracket 44 and to each side thereof are spring support brackets 46, each bracket having an inclined leg extending inwardly of the container 10, each of said legs being fixedly connected to one end of a leaf spring 48. The springs 48 function as kick-back bars, the free end 49 of the springs bearing against the side of the depending leg 28" of each bracket 28.

One spring 48 is provided to cooperate with each of the brackets 28. Each spring 48 has its free end 49 remote from the spring support bracket 46, engaging the inner surface of the vertical leg 28" of the associated bracket 28 to maintain the trap door in its closed position under the influence of the springs 48, as well as under the influence of the counter-weights 40 and the magnetic attraction between the magnet 36 and bracket 44.

As a weight, such as a light weight animal, is placed on the trap door forwardly of its pivotal axis so as to overcome the combined effort of the counter-weights 40, the magnetic attraction between the magnet 36 and bracket 44, the trap door will be swung downwardly to the open position in overcoming the resilient effort of the springs 48. As the trap door moves to its open position, a free end 49 of each spring 48 will ride upwardly on the inner surface of the associated bracket leg 28" to the right angle corner of the bracket 28. Further downward movement of the trap door will cause the free end of the bracket leg 28" to engage the adjacent surface of the associated spring 48 causing the spring to bow and tension as it is also caused to move from the bracket corner along the inner surface of the other bracket leg 28' to the position shown in broken lines in Figure 1. This will result in the resilient tension force of the bowed spring to be directed against the free end of the associated bracket leg 28" and against the inner surface of the other bracket leg 28' to bias the trap door toward its closed position shown in full lines in Figure 1.

Thus when the weight on the trap door is released by sliding off into the container 10, the springs 48 will exert the resilient effort necessary to effect the return movement of the trap door to its closed position. The springs 48 are so arranged as to permit a very light weight animal to move the trap door about its pivotal axis to the open position, yet exerting a powerful snap action to close the trap door when the animal slides off the lowered end of the trap door and into the interior of the container 10.

Means is provided on the animal trap for attracting an animal, and to this end, a bait rod 50 is provided, said bait rod extending horizontally above the front wall of the container substantially from side to side thereof. The bait rod is projected, at its opposite ends, through the end walls of a cylindrical bait protector 52, the bait B used on the trap being impaled upon the rod 50. It will be understood that the protector 52 is removable, to permit bait to be applied to the rod, after which the protector 52 is returned to the position thereof shown in the drawings, thus to prevent the animal from eating to bait.

After an animal has been entrapped, it is, of course, necessary that means be provided for removing the animal, and accordingly, a rectangular opening 54 is formed in the front wall of the trap, adjacent the bottom plate 12. The opening 54 is provided with a U-shaped guide 56, which is shown to particular advantage in Figure 3. The guide 56 has vertical side legs extending upwardly from a bight, said bight extending along the lower edge of the opening 54.

Slidably engaged in the vertical side legs of the guide 56 is a closure plate 58, which can be provided with a handle at its upper edge.

The closure plate 58, of course, can be lifted whenever the animal is to be removed.

In use of the device, the trap door 30 will normally be in the closed position shown in Figure 1. It will be understood, in this regard, that the top surface of the trap door would preferably be highly polished, so as to be quite slippery.

In any event, an animal attracted by the bait B will move onto the trap door, as a result of which the weight of the animal will cause said door to swing to the dotted line, open position illustrated in Figure 1. The animal will, as a result, drop into the container 10.

The trap door will immediately be snapped to a closed position by a trigger-like action resulting from the combined effect of the spring 48, counter-weights 40, and magnet 36, thus to prevent escape of the animal.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An animal trap comprising a container open at its upper end and having a bottom plate, front and back walls positioned in spaced relation and supported on said bottom plate and a side wall connecting the adjacent ends of the front and back walls, a magnetically attracted supporting bracket having a vertical leg and a horizontal leg projecting from one end of the vertical leg positioned adjacent the upper end of said container and having the vertical leg extending along and secured to said back wall with the horizontal leg projecting towards said front wall, a trap door normally closing the upper end of said container, a magnet dependingly carried by the undersurface of said door and magnetically seated on the horizontal leg of said supporting bracket, a hinge pin extending transversely of said container forwardly of and spaced from the horizontal leg of said supporting bracket and fixedly supported on said container sidewalls, an angle bracket having a vertical leg and a horizontal leg projecting from one end of the vertical leg positioned adjacent each of the side edges of said door and having the horizontal leg abutting and secured to the underface of said door with the vertical leg depending therefrom, a hinge sleeve on the free end of the horizontal leg of each of said angle brackets and circumposed about the adjacent portion of said hinge pin to thereby connect said trap door to said container for hinged movement from said closed position to an open position under the weight of an animal, an upstanding leaf spring positioned within said container and having its lower end fixed to said backwall and having its other end bearing against the inner face of the vertical leg of the adjacent angle bracket, and a bait holder mounted on the front wall of the container adjacent the upper end thereof.

2. An animal trap comprising a container open at its upper end and having a bottom plate, front and back walls positioned in spaced relation and supported on said bottom plate and a side wall connecting the adjacent ends of the front and back walls, a magnetically attracted supporting bracket having a vertical leg and a horizontal leg projecting from one end of the vertical leg positioned adjacent the upper end of said container and having the vertical leg extending along and secured to said back wall with the horizontal leg projecting towards said front wall, a trap door normally closing the upper end of said container, a magnet dependingly carried by the undersurface of said door and magnetically seated on the horizontal leg of said supporting bracket, a hinge pin extending transversely of said container forwardly of and spaced from the horizontal leg of said supporting bracket and fixedly supported on said container sidewalls, an angle bracket having a vertical leg and a horizontal leg projecting from one end of the vertical leg positioned adjacent each of the side edges of said door and having the horizontal leg abutting and secured to the underface of said door with the vertical leg depending therefrom, a hinge sleeve on the free end of the horizontal leg of each of said angle brackets and circumposed about the adjacent portion of said hinge pin to thereby connect said trap door to said container for hinged movement from said closed position to an open position under the weight of an animal, an upstanding leaf spring positioned within said container and having its lower end fixed to said backwall and having its other end bearing against the inner face of the vertical leg of the adjacent angle bracket, a bait holder mounted on the front wall of the container adjacent the upper end thereof, and counterweights carried by said door adjacent said magnet for retaining said door in its closed position.

References Cited in the file of this patent

UNITED STATES PATENTS

| | | |
|---|---|---|
| 181,446 | Jenne | Aug. 22, 1876 |
| 212,430 | Bennett | Feb. 18, 1879 |
| 1,012,400 | McCombs | Dec. 19, 1911 |
| 1,165,894 | Negraval | Dec. 28, 1915 |
| 1,597,551 | Stewart | Aug. 24, 1926 |

FOREIGN PATENTS

| | | |
|---|---|---|
| 11,556 | Great Britain | 1892 |